Patented Sept. 12, 1933

1,926,747

UNITED STATES PATENT OFFICE 1,926,747

CONVERSION OF FERROPHOSPHORUS

Nils C. Lindberg, Crete, and Benjamin Toubes, Chicago Heights, Ill., assignors to Victor Chemical Works, a corporation of Illinois No Drawing. Application January 2, 1931
Serial No. 506,303

10 Claims. (Cl. 23—106)

The present invention relates to improvements in the conversion of ferrophosphorus into useful products, and more particularly to the conversion of its phosphorus content into phosphates.

In accordance with the present invention, the ferrophosphorus, which may vary from 10 to 30% phosphorus content and in general is preferably from 22 to 26% phosphorus, is ground very finely, say to about 200 mesh, and is then mixed with an alkali metal carbonate, such as potassium carbonate, sodium carbonate or the like and preferably the latter, in reacting proportions. For example, suitable proportions may be 44% ferrophosphorus containing 25% P. and 56% soda ash. It has been found that segregation of the constituents of the mixture, which tends normally to occur, may be avoided by moistening the mixture with small proportions, say up to 10 or 15%, of the weight of the mixture of water or dilute alkali metal phosphate solution such as is secured in later stages of the process. When water is employed, while segregation of the constituents of the mixture is effectively avoided, there becomes apparent a tendency of the mixture to cake and harden, which is disadvantageous in the further steps of the operation. By using a dilute sodium phosphate liquor, such as is derived in the later stages of the process, the segregation of the constituents of the mixture of ferrophosphorus and alkali metal carbonate is effectively prevented and at the same time there is no tendency for the resulting mixture to cake and harden. The solution thus used may be from 1 to 5° Bé. or even higher in strength, although concentrations above 3 to 5° Bé. are not necessary. It is preferred to employ weak phosphate liquors derived from the process as hereinafter described, and ranging from 1 to 3° Bé., since their use has, in addition to the advantages hereinbefore stated, the further advantage of preventing accumulations of water in the operating system.

The mixture is then heated or roasted in an oxidizing atmosphere to a reacting temperature below the fusion point of the mixture in any suitable device, such as an open hearth furnace, a rotary furnace or the like. The temperature to which the mixture is heated is preferably to between 1000 and 1100° C., although somewhat lower temperatures, say down to 900° C., or somewhat higher temperatures not causing fusion of the mixture may be employed. The heating of the mixture is continued, preferably without appreciable or apparent fusion, until reaction is completed.

The hot reaction mixture is discharged directly into the leaching liquor, which may be water or preferably an aqueous solution of phosphate liquor derived from the process as hereinafter more fully described. The contacting of the reaction mixture while hot with the leaching liquid modifies both the physical and chemical characteristics of the insoluble residue of the mixture, which is largely iron oxide. Thus, if the reaction mixture is cooled and then leached, a brown iron oxide is secured which tends to remain in suspension to a greater extent and settles relatively slowly. If the reaction mixture, however, is contacted while hot from the furnace with the leaching liquid, the iron oxide residue is black in color and settles better and more rapidly than the brown iron oxide residue secured in the cold contacting or leaching operation. The hot contacting or leaching operation has the further advantage of yielding stronger and more concentrated leaching liquors, and of preventing water accumulation in the system by causing evaporation.

Although water or a more dilute phosphate liquor may be employed for contacting and leaching the reaction mixture, in accordance with this invention it is preferred to employ a mixed sodium phosphate liquor of 12 to 20° Bé., and preferably 16 to 18° Bé. A suitable liquor for this purpose may be obtained by mixing mother liquor from the final crystallizing operation for the phosphate product with wash liquors derived from the process, such as the first liquor from the washing of the iron oxide residue from the initial leaching operation. The mother liquor so used will range from 20 to 25° Bé. and the wash liquor from 12 to 14° Bé., the two being mixed in proportions to give a leaching liquor ranging from 14 to 20° and preferably between 16 and 18° Bé.

After contacting with the phosphate liquor the reaction mixture from the reaction between the ferrophosphorous and soda ash, the iron oxide residue is permitted to settle and the liquor drawn off, the latter, after clarification, having a strength of 30 to 40° Bé., and preferably about 36° Bé. This strong solution or liquor containing trisodium phosphate is found to filter with great difficulty if attempts are made to filter it directly. In accordance with this invention, it is first passed through a centrifugal clarifier for removing the greater portion of suspended materials, the centrifugal clarifier used being suitably of the large bowl or imperforate basket type. The centrifuged liquor is found to be further improved in its subsequent filtrability by the addition to it of a small amount of caustic soda, sufficient to bring the solution to a slight excess over the theoretical alkalinity of trisodium phosphate, say 1 to 2% or slightly higher. This addition of caustic soda not only improves the filtrability of the liquor but also appears to reduce the iron impurity content of the final phosphate product.

The liquor is then passed to a filter of any suitable type, such as a drum filter, plate and frame filter or the like, and after filtration passes to suitable crystallizers, in which the alkali phosphate, for example, trisodium phosphate is crystallized out. The mother liquor drawn off from the crystals, which may suitably be of 20 to 25° Bé. is used in making up the leaching liquor for leaching the reaction product from the heating of the ferrophosphorus and alkali carbonate.

The iron oxide residue deposited from the solution formed on leaching the reaction mixture from the furnace is washed with water or preferably with the weak liquor derived from a later washing of the iron oxide residue, to which may be added the dilute liquor secured by washing the material thrown out in the centrifugal clarifier above referred to. The wash liquor is used in such proportions as to be, after the washing operation, of a Baumé gravity ranging from 10 to 15° and generally from 12 to 14°. This first wash liquor is mixed with the mother liquor, as hereinbefore described, to form the liquor for leaching the reaction mixture from the furnace.

After the first washing, the iron oxide residue is again washed with a small amount of water to remove any residual phosphate before the iron oxide is discarded from the system. The resulting second or weak wash liquid may have a Baumé gravity up to 5° and is in general from 1 to 3°. A portion of this weak or second wash liquor may be used, as hereinbefore described, to admix with the ferrophosphorus and sodium carbonate in order to prevent segregation thereof. The greater portion of the second or weak last wash liquor, however, is used in the first washing of the iron oxide residue from the initial leaching of the reaction mixture from the furnaces.

Although reference has been made herein to the use of sodium carbonate in the reaction mixture, other alkali metal carbonates, such as potassium carbonate may be used, as may equivalent oxygen-yielding or phosphate forming alkali metal compounds, such as the caustic alkalies or alkali metal sulfates, which may be substituted in part or in whole for the alkali metal carbonates, with such change in reaction temperatures in the furnace as may be required.

We claim:

1. The method of converting ferrophosphorus into phosphates which comprises admixing ground ferrophosphorus and alkali metal carbonate, moistening the mixture with an aqueous solution of an alkali metal phosphate, and subjecting the mixture to a reaction temperature below fusion temperature to convert the phosphorous content of the ferrophosphorus into phosphates.

2. The method of converting ferrophosphorus into phosphates which comprises admixing finely comminuted ferrophosphorus with alkali metal carbonate, moistening the mixture with dilute alkali metal phosphate solution to prevent segregation of the constituents, and heating the mixture to reaction temperature below fusion temperature.

3. The method of converting ferrophosphorus into useful products wherein comminuted ferrophosphorus is admixed with alkali metal carbonate, the mixture heated to reaction temperature and the resulting reaction mixture leached to dissolve alkali metal phosphate, the steps of adding dilute liquor from said leaching to admixed ferrophosphorus and alkali metal carbonate prior to heating thereof to prevent segregation of the mixture.

4. In the conversion of ferrophosphorus into useful products, heating ferrophosphorus with an alkali metal carbonate to form phosphates, leaching the reaction mixture to form a phosphate solution, separating the resulting liquor from undissolved residue, adding caustic alkali thereto, and filtering the liquor.

5. In the conversion of ferrophosphorus into useful products, heating ferrophosphorus with an alkali metal carbonate to form phosphates, leaching the reaction mixture to form a phosphate solution, separating the resulting liquor from undissolved residue, adding caustic alkali thereto to bring the solution slightly above the alkalinity of a trisodium phosphate solution of corresponding $P_2O_5$ content, and filtering the liquor.

6. In the conversion of ferrophosphorus into useful products, heating ferrophosphorus with an alkali metal carbonate to form phosphates, leaching the reaction mixture to form a phosphate solution, removing the resulting liquor, centrifuging it in a centrifuge of the imperforate basket type to remove solids, and filtering and crystallizing the liquor.

7. In the conversion of ferrophosphorus into useful products, heating ferrophosphorus with an alkali metal carbonate to form phosphates, leaching the reaction mixture to form a phosphate solution, removing the resulting liquor, separating suspended solids therefrom, adding caustic alkali to the liquor, and then filtering it.

8. In the method of preparing alkali phosphates by heat treatment of comminuted ferrophosphorus and an alkali metal carbonate, the step which comprises moistening the mixture with an aqueous solution of an alkali metal phosphate, thereby preventing segregration of its constituents.

9. In the method of preparing alkali phosphates by heat treatment of comminuted ferrophosphorus and an alkali metal carbonate, the step which comprises moistening the mixture with a dilute solution of an alkali metal phosphate, thereby preventing segregation of its constituents.

10. In the method of preparing alkali phosphates by heat treatment of comminuted ferrophosphorus and an alkali metal carbonate, the step which comprises moistening the mixture with 10–15% of a dilute alkali metal phosphate.

NILS C. LINDBERG.
BENJAMIN TOUBES.